US007751996B1

(12) United States Patent
Ardizzone et al.

(10) Patent No.: US 7,751,996 B1
(45) Date of Patent: Jul. 6, 2010

(54) MEASUREMENT SYSTEM FOR DETERMINING DESIRED/UNDESIRED RATIO OF WIRELESS VIDEO SIGNALS

(75) Inventors: Giuseppe Ardizzone, Warwick, RI (US); Robert C. Tenten, Fanwood, NJ (US)

(73) Assignee: Sprint Communications Company L.P., Overland Park, KS (US)

( * ) Notice: Subject to any disclaimer, the term of this patent is extended or adjusted under 35 U.S.C. 154(b) by 875 days.

(21) Appl. No.: 11/637,575

(22) Filed: Dec. 12, 2006

(51) Int. Cl.
*G01R 13/00* (2006.01)
(52) U.S. Cl. .............................. 702/69; 702/70; 702/71; 702/72; 702/73; 702/74; 702/78; 702/79; 348/21; 348/445; 348/525; 348/555; 348/558; 348/607; 348/614; 455/67.11
(58) Field of Classification Search ............. 702/69–74, 702/78, 79; 348/21, 445, 525, 555, 607, 348/614; 455/67.11
See application file for complete search history.

(56) References Cited

U.S. PATENT DOCUMENTS

| | | |
|---|---|---|
| 4,096,529 A | 6/1978 | Baum et al. |
| 4,216,496 A | 8/1980 | Lothian et al. |
| 5,752,164 A | 5/1998 | Jones |
| 6,201,576 B1 | 3/2001 | Raghunath et al. |
| 6,337,711 B1 | 1/2002 | Dickinson et al. |
| 6,421,077 B1 | 7/2002 | Reed, Jr. |
| 2001/0034208 A1* | 10/2001 | Kline et al. ................. 455/67.1 |
| 2004/0132457 A1 | 7/2004 | Sanders et al. |
| 2004/0257471 A1* | 12/2004 | Kim .......................... 348/554 |

OTHER PUBLICATIONS

Mini-Circuits, *Digital Step Attenuator*, Jun. 7, 2003.
Intersil, *Data Sheet-Sync Separator, 50% Slice, S-H, Filter $^H OUT$*, May 5, 2006, pp. 1-10.
Analog Devices, *Fast Voltage-Out DC-440 MHz, 95 dB Logarithmic Amplifier-AD8310*.

* cited by examiner

*Primary Examiner*—Drew A Dunn
*Assistant Examiner*—Sujoy K Kundu (57) ABSTRACT

A D/U ratio is measured for desired and undesired signals in a wireless video transmission system at a shared channel frequency based on a received signal at a geographic location in proximity to regions within respective service areas for the desired and undesired signals. A video tuner demodulates the received signal to generate a baseband video signal. A leveling circuit normalizes the baseband signal. A video processor identifies horizontal sync pulses within the baseband signal, generates a sampled signal comprising the horizontal sync pulses, and removes components of the desired signal from the sampled signal to generate an undesired signal component. A D/U analyzer determines a Fourier transform having a plurality of bins in response to the undesired signal component, identifies at least one of the bins having a spectral peak corresponding to an undesired signal, and calculates the D/U ratio in response to a magnitude of the identified peak.

17 Claims, 12 Drawing Sheets

MEASUREMENT SYSTEM FOR DETERMINING DESIRED/UNDESIRED RATIO OF WIRELESS VIDEO SIGNALS

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to determining co-channel interference levels for wireless transmissions, and, more specifically, to measuring a desired/undesired ratio using portable equipment that does not require disruption of broadcasting or complicated test equipment or procedures.

In connection with obligations of licensees of wireless broadcasting services, it often becomes necessary to measure various signals at potential receiving locations in order to comply with requirements designed to minimize interference between different broadcasters. For example, in the Broadband Radio Service (BRS) authorized in a 2.5 GHz band by the Federal Communications Commission in the United States, a transition is being conducted wherein licensees of the Multipoint Distribution Service (MDS) are being reassigned to frequencies in the BRS. The BRS has been used to broadcast analog television (i.e., video) signals. Some new licensees in the BRS will operate on the same frequencies as existing licensees with the band. Licensees at the same frequencies will operate in respective service areas, but the potential for co-channel interference still exists and the FCC has specified certain interference requirements to be met. More specifically, the FCC requires that, as measured at a particular receiving site, the co-channel desired/undesired (D/U) ratio for a protected (i.e., previously existing) licensee must be at least the lesser of either 45 dB or the actual D/U ratio at the receiving site for the previously existing licensee prior to the transition minus 1.5 dB.

It is known that D/U ratio measurements can be done by first measuring the received power of a desired signal and then shutting off the desired transmitter and measuring the level of any undesired signal that may be present. This type of testing creates problems because it may be necessary to shut off the transmitter repeatedly or for noticeably long periods, resulting in interruption of programming to viewers being served by the BRS licensee (which may be a cable television provider, for example). In addition, the coordination required if multiple receive sites are being transitioned can be difficult and time consuming.

Difficulties arise when attempting to conduct measurements of desired and undesired power when both signals are present simultaneously. Typically, the undesired signal falls within a well-defined window relative to the desired signal. Considering the BRS service, the frequency difference between the two signals will be between 0 kHz and 11 kHz, and the D/U need only be measured down to 45 dB. As the frequency separation between the two transmitters approaches zero, extremely high resolving capability would be required in any measuring equipment. This situation can be improved by shifting the frequency of the desired transmitter to increase the separation, but even with frequency shifting the proximity of the desired and undesired carrier frequencies as well as the complex voltage of the active video signal makes the D/U measurement virtually impossible using standard test equipment. Relatively expensive equipment and/or highly skilled test operators have been required.

SUMMARY OF THE INVENTION

The present invention achieves an accurate and convenient system and method for determining D/U ratios without disrupting any broadcast signals and without requiring expensive test equipment or highly specialized training of test technicians.

In one aspect of the invention, a system is provided for measuring a D/U ratio for desired and undesired signals in a wireless video transmission system at a shared channel frequency based on a received signal at a geographic location in proximity to regions within respective service areas for the desired and undesired signals. A video tuner demodulates the received signal to generate a baseband video signal. A leveling circuit normalizes the baseband signal. A video processor identifies horizontal sync pulses within the baseband signal, generates a sampled signal comprising the horizontal sync pulses, and removes components of the desired signal from the sampled signal to generate an undesired signal component. A D/U analyzer determines a Fourier transform having a plurality of bins in response to the undesired signal component, identifies at least one of the bins having a spectral peak corresponding to an undesired signal, and calculates the D/U ratio in response to a magnitude of the identified peak.

DETAILED DESCRIPTION OF PREFERRED EMBODIMENTS

Figure 1:
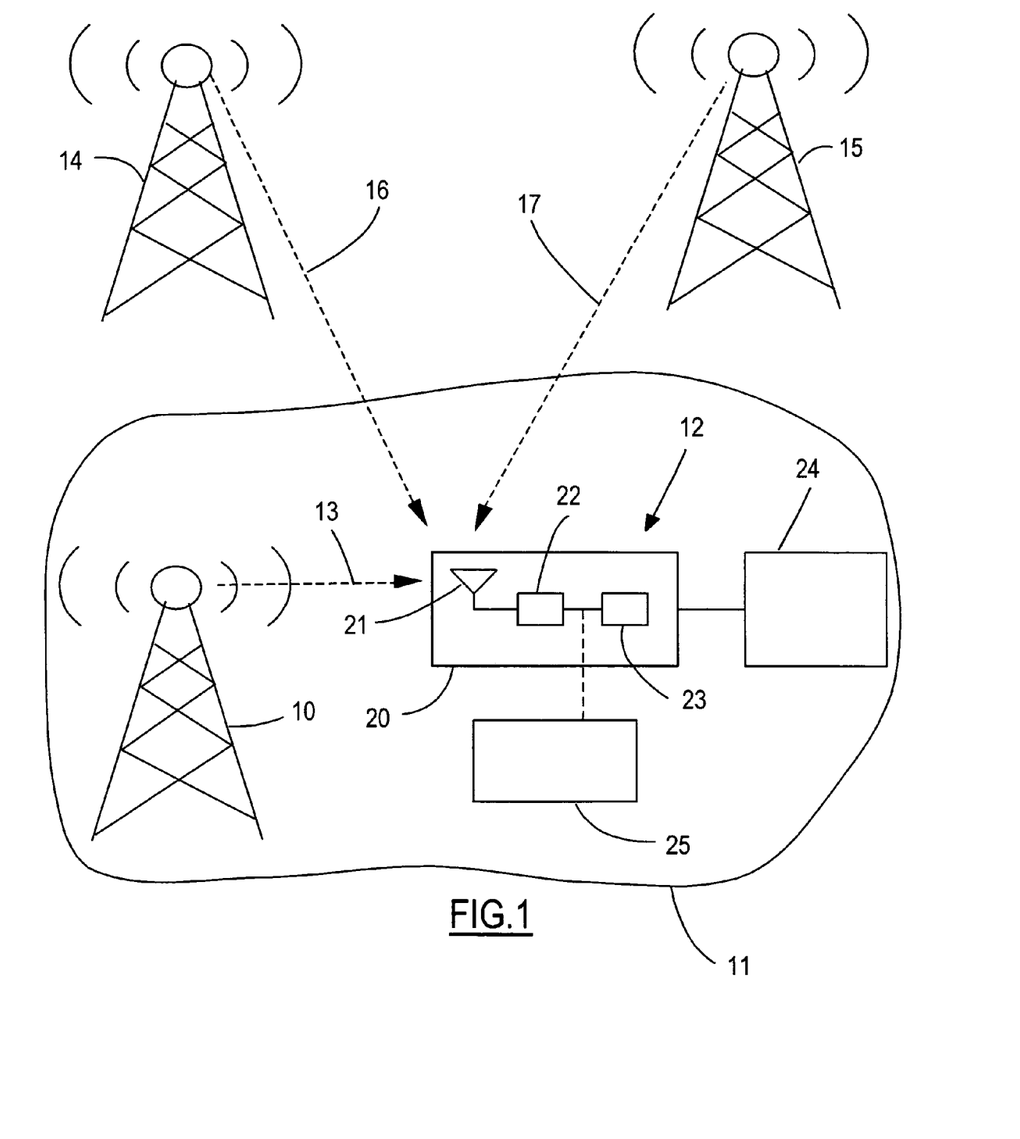
FIG. 1 is a diagram showing the spatial relationship between a receiving site and desired and undesired transmitters.

Referring now to the drawings, FIG. 1 shows a transmitter 10 with a corresponding service area 11 having a receive site 12. RF broadcast signals 13 propagate from transmitter 10 to receiving site 12. Undesired transmitters 14 and 15 in other service areas radiate broadcast signals 16 and 17, respectively, that also reach receiving site 12. The present invention measures the D/U ratio corresponding to the various broadcasts to ensure compliance with FCC regulatory levels and to facilitate adjustments by the operators of the transmitters to achieve compliance.

A receiver 20 located at receiving site 12 is connected to a video distribution system 24, such as a cable headend. Receiver 20 includes an antenna 21, a downconverter 22, and a demodulator 23. A test system 25 of the present invention is connected to the output of downconverter 22.

Figure 2:
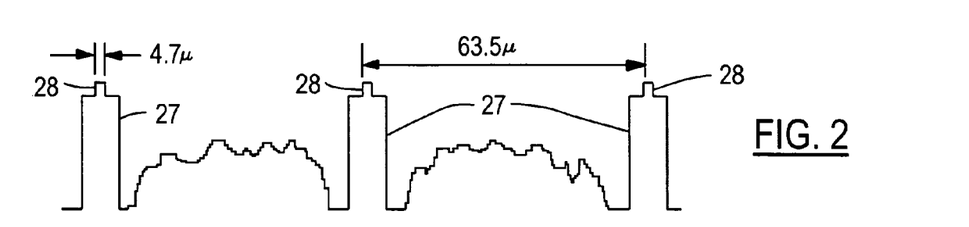
FIG. 2 is a waveform diagram showing an NTSC baseband television signal.

In order to be able to measure the much lower level undesired signals in the presence of the strong desired signals, the present invention takes measurements at a time during which the voltage of the desired video signal is substantially constant so that the measured variation in voltage is caused by the presence of undesired signals. In particular, measurements are made during horizontal sync pulses. During the horizontal sync pulses, the signal carrier is at its highest level. In addition, the sync pulses are evenly distributed over time, making them well suited for use as a measurement time because it is easier to detect variations in the horizontal sync pulses resulting from an interfering undesired signal. As shown in FIG. 2, regular horizontal blanking intervals 27 include respective horizontal sync pulses 28. Each horizontal sync pulse lasts 4.7 µS, and consecutive horizontal sync pulses repeat at a period of 63.5 µS (i.e., they repeat at a frequency of 15.734 kHz).

Figure 3:
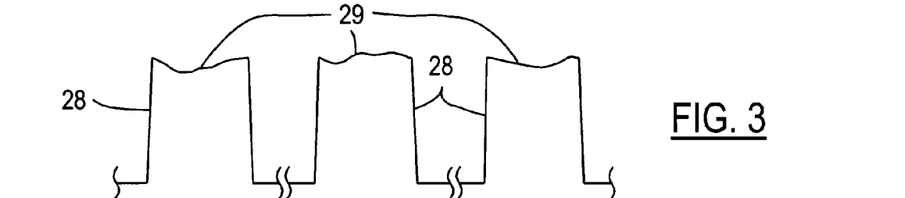
FIG. 3 shows horizontal sync pulses in the presence of an undesired signal.

As broadcast, each horizontal sync pulse is a square pulse having a predetermined, constant voltage level. As shown in FIG. 3, the received horizontal sync pulses deviate from the ideal pulse shape due to interfering transmissions from undesired transmitters. Thus, the amplitude or received signal strength corresponding to each horizontal sync pulse has deviations 29 superimposed on the ideal pulse shape as a result of energy from interfering sources having an overlapping frequency spectra.

The horizontal sync pulses contain no program material, occur every 63.5 µS at the highest RF signal level, and as seen at the receiver have a substantially constant received signal strength. Variations in signal strength seen at the times of the horizontal sync pulse are thus due to contributions by undesired signals. By limiting the measurement to coincide with the horizontal sync pulses, the invention can remove the active video portion of the signal so that the measured variations are due to undesired signals which are automatically separated from the desired sync pulses. By constructing a sampled waveform containing only data from horizontal sync pulses, a frequency analysis can be employed to distinguish between desired and undesired signal contributions. Since the expected signal strength of the desired signal alone is substantially constant, the desired signal contribution shows up as the portion of the frequency spectra at around 0 Hz (i.e., DC). Other signal contributions correspond either to undesired broadcasts on the same shared channel frequency or noise.

Figure 4:
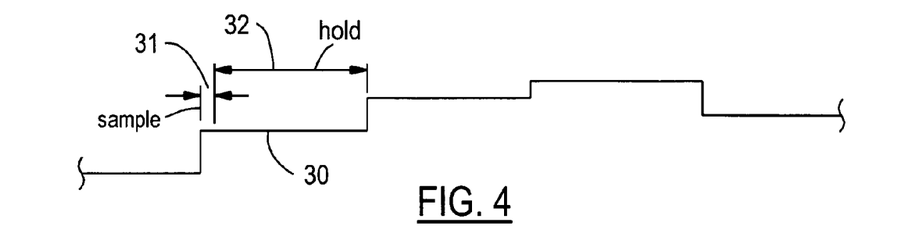
FIG. 4 shows a sync-amplitude signal obtained by sampling and holding a sync level signal.

FIG. 4 shows a preferred embodiment for constructing a sampled sync signal containing only signal components present during the horizontal sync pulses. Thus, a sampled sync signal 30 has a magnitude determined by sampling an average signal strength level of an individual horizontal sync pulse at 31 and holding that sample value at 32 until the occurrence of the next horizontal sync pulse. The sample interval 31 may last for about 3 µS during a center portion of a horizontal sync pulse, for example. Hold period 32 then comprises the remaining 60.5 µS. Thus, sampled sync signal 30 represents the varying energy content derived from the undesired signals.

Figure 5:
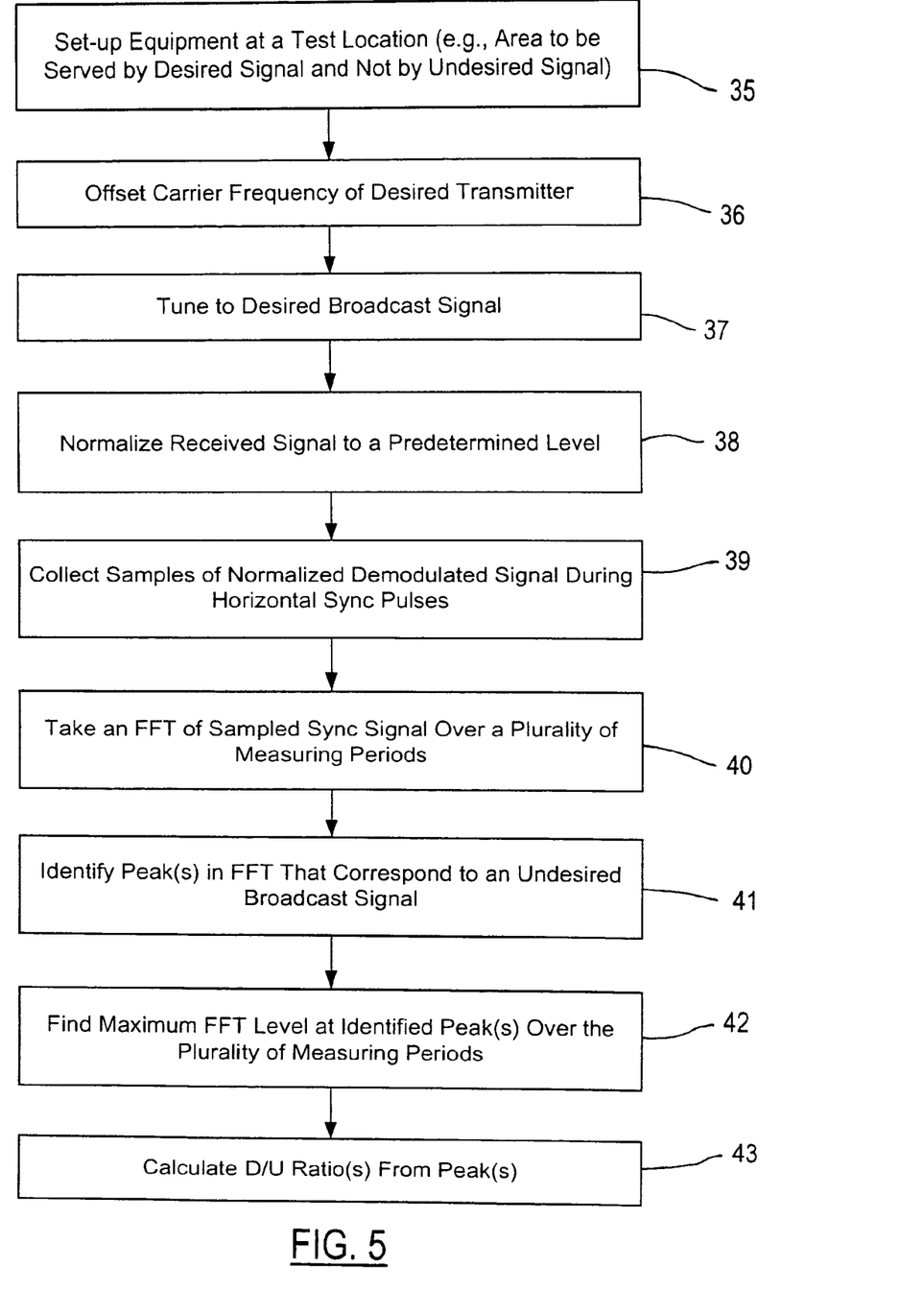
FIG. 5 is a flowchart showing one preferred method of the present invention.

FIG. 5 shows an overall method of the present invention wherein test equipment is set up at a test location in step 35. Typically, the test system equipment is installed in association with a fixed receiver within the area being served by the desired signal and outside the service area for the undesired signal. In step 36, the carrier frequency of the desired transmitter is offset by a predetermined offset frequency from the shared channel frequency assigned by the FCC. As explained below, the use of a frequency offset allows energy contributions from undesired signals to be distinguished from noise or other non-video sources.

In step 37, the test equipment is tuned in order to receive the desired broadcast signal. The predetermined offset frequency introduced for the desired transmitter is sufficiently small (e.g., about 2-3 kHz) that tuning to and receiving the desired broadcast signal is not significantly affected.

In order to reliably compare the desired signal level to an undesired signal level, the received signal seen by the reception antenna is normalized to a predetermined level in step 38. The tuner demodulates the desired signal and samples of the normalized demodulated signal are collected during the horizontal sync pulses in step 39.

In step 40, a fast Fourier transform (FFT) is calculated for each sampled sync signal derived from a respective one of a plurality of measuring periods. A measuring period lasting about 200 mS, for example, is input to a spectrum analyzer to calculate all the frequency components of each FFT. In step 41, peaks are identified in any particular FFT that correspond to an undesired broadcast signal. Once the frequency of an undesired signal is identified according to the peaks, then the maximum level of the FFT at the identified peak frequencies is determined over the plurality of measuring periods. Due to the phase relationship between the horizontal sync pulses of the desired signal and the frequency content of the interfering portion of an undesired signal, the energy of the interfering signal oscillates between constructive interference and destructive interference. By identifying a maximum FFT level, the maximum constructive interference can be found which corresponds to the true D/U ratio. Typically, the plurality of measuring periods covers a time span of about 35 seconds to ensure that the appropriate maximum has occurred. In step 43, the D/U ratio is calculated for each undesired signal's carrier frequency identified by a corresponding peak. If the worst D/U ratio is below the regulatory limit, then calculation of D/U ratios for other interfering undesired signals would be unnecessary.

Figures 6, 7:
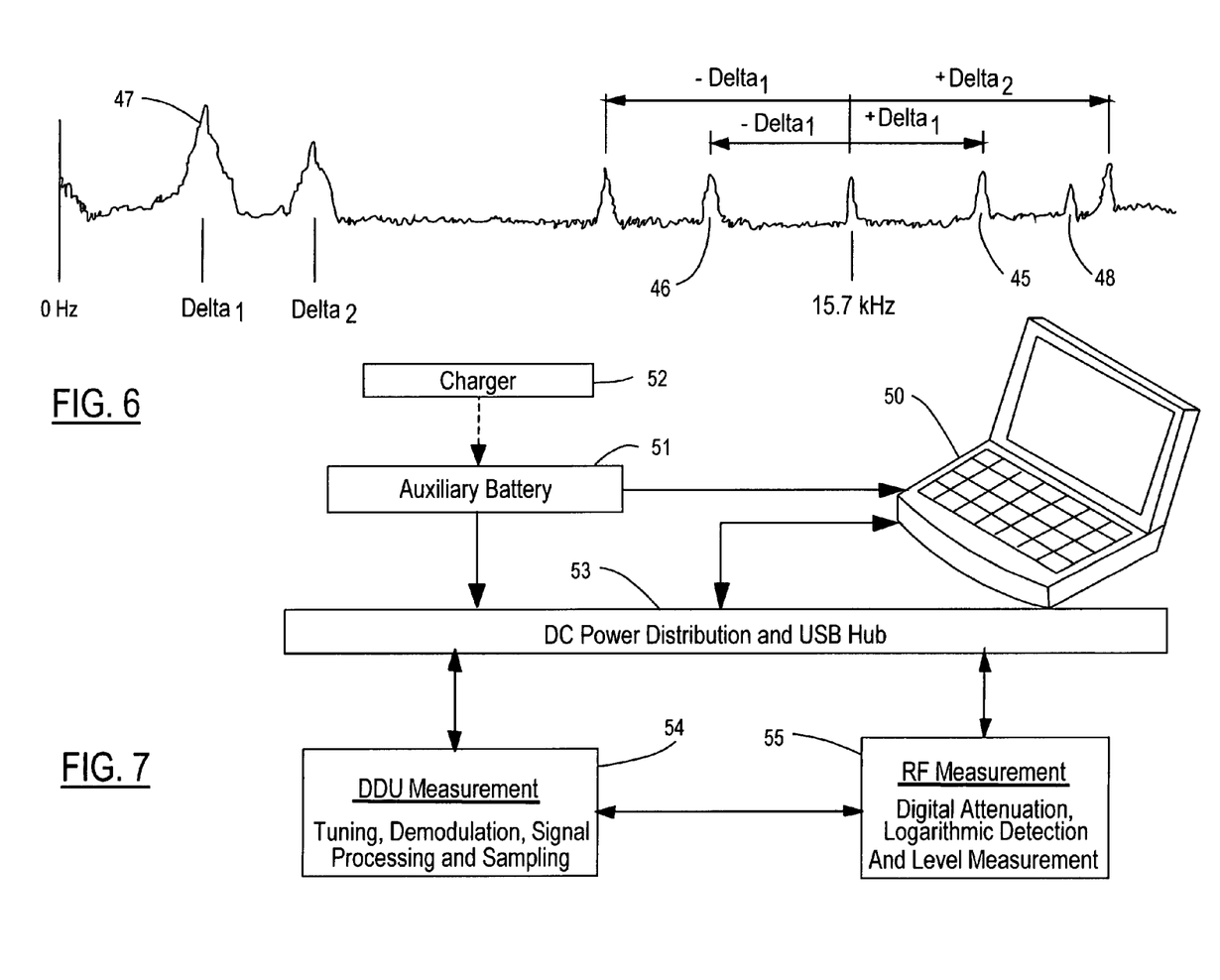
FIG. 6 is a frequency-power spectrum of a sampled sync signal showing the presence of interfering undesired signals.
FIG. 7 is a block diagram showing main functionality of a test system of the present invention.

FIG. 6 shows a calculated Fourier transform corresponding to the frequency spectra for the sampled sync signal over one measuring period. The carrier frequency of the desired transmitter is offset so that the carrier frequency of any undesired transmitters on the shared channel frequency will be seen in this frequency spectrum as being offset from zero Hz. Due to variations in the precision of the frequency reference used by various transmitters, some small offset may normally be seen between the desired and any undesired frequency signals. By deliberately adding an additional offset of around 5 kHz, the undesired frequencies are easier to identify and can be positively identified as an interfering signal in the following manner.

Due to the presence of the desired signal, a frequency peak is seen at 15.734 kHz corresponding to the repetition frequency of the horizontal sync pulses in the desired signal. If an undesired signal is present, then the energy of the horizontal sync pulses contained in the undesired signals are likewise shown as spectral peaks in the Fourier transform. As a result of folding during demodulation, however, spectral peaks corresponding to the horizontal sync pulses of any particular undesired signals are shown at the corresponding frequency offset both above and below the spectral peak at 15.7 kHz. Thus, a frequency-power peak 45 appearing at a difference frequency equal to $DELTA_1$ corresponds with a symmetrical peak 46 at a difference frequency equal to negative $DELTA_1$ from 15.734 kHz. Since spectral peaks 45 and 46 are symmetrically spaced above and below the frequency of the horizontal sync pulses, it can be concluded that frequency $DELTA_1$ identifies the frequency of a spectral peak 47 of the corresponding undesired signal carrier. Likewise, a second undesired signal appears at a frequency $DELTA_2$ as confirmed by symmetrical placed spectral peaks corresponding to the horizontal sync pulses of the second undesired signal. Another spectral peak 48 in the vicinity of the peak at 15.7 kHz is found not to correspond to an undesired signal because it has no matching spectral peak symmetrically placed on the opposite side of 15.7 kHz. Therefore, it can be concluded that spectral peak 48 is due to noise or some other radiated admission source which does not need to be considered in order to determine the D/U ratio.

FIG. 7 shows a portable test system based on a laptop PC 50. An auxiliary battery 51 and charger 52 are provided for allowing prolonged periods of use without continuous connection to an active power source. A DC power distribution and USB hub 53 is coupled to laptop 50, a DDU measurement block 54, and an RF measurement block 55. RF measurement block 55 receives the VHF/UHF RF input also seen by the receiver installed at the test site. Digital attenuation, logarithmic detection, and level measurement of horizontal sync pulses are performed in RF measurement block 55. DDU measurement block 54 performs tuning, demodulation, and signal processing and sampling.

Figure 8:
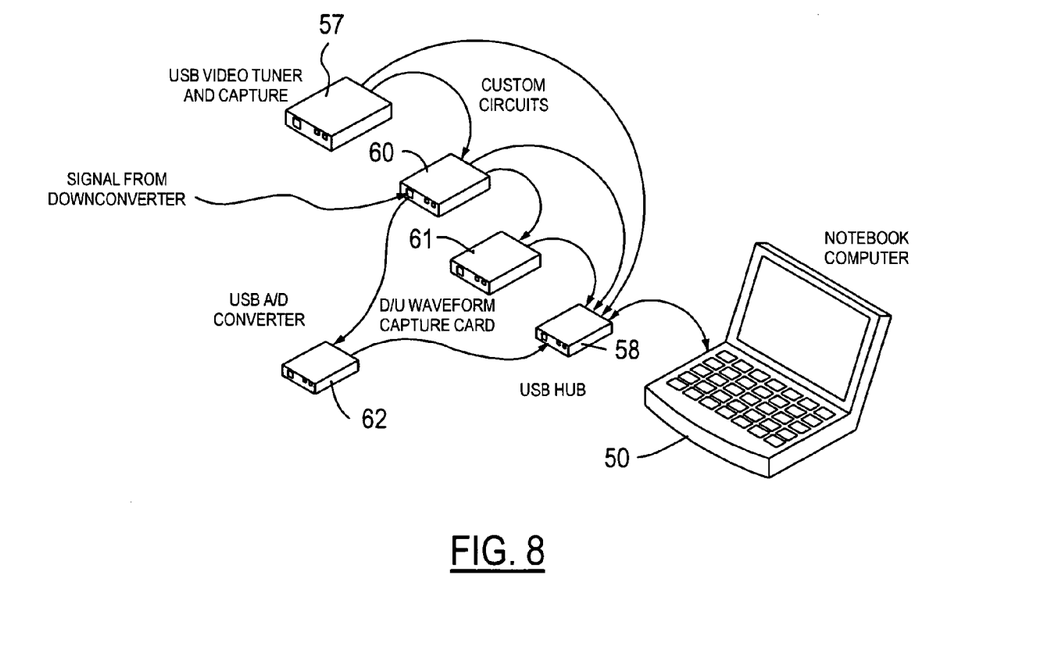
FIG. 8 is a block diagram showing one preferred hardware embodiment of the system of FIG. 7.

FIG. 8 shows a preferred embodiment of the test system in greater detail. A USB video tuner and capture card 57 is controlled by laptop 50 and provides a demodulated video/audio signal to laptop 50 through a USB hub 58. The demodulated signal may also be stored by the capture feature in card 57 under control of laptop 50. The demodulated signal is also provided along with an intermediate frequency signal to a custom circuit block 60 which generates a sampled sync signal as will be described below. The sampled sync signal may be stored in a D/U waveform capture card 61. A USB A/D converter 62 is coupled to custom circuit block 60 and to USB hub 58 for providing conversion of a level detection signal as will be described below. Custom circuit block 60 receives an RF signal from the downconverter which is part of the normal installation at the receive site.

Figure 9:
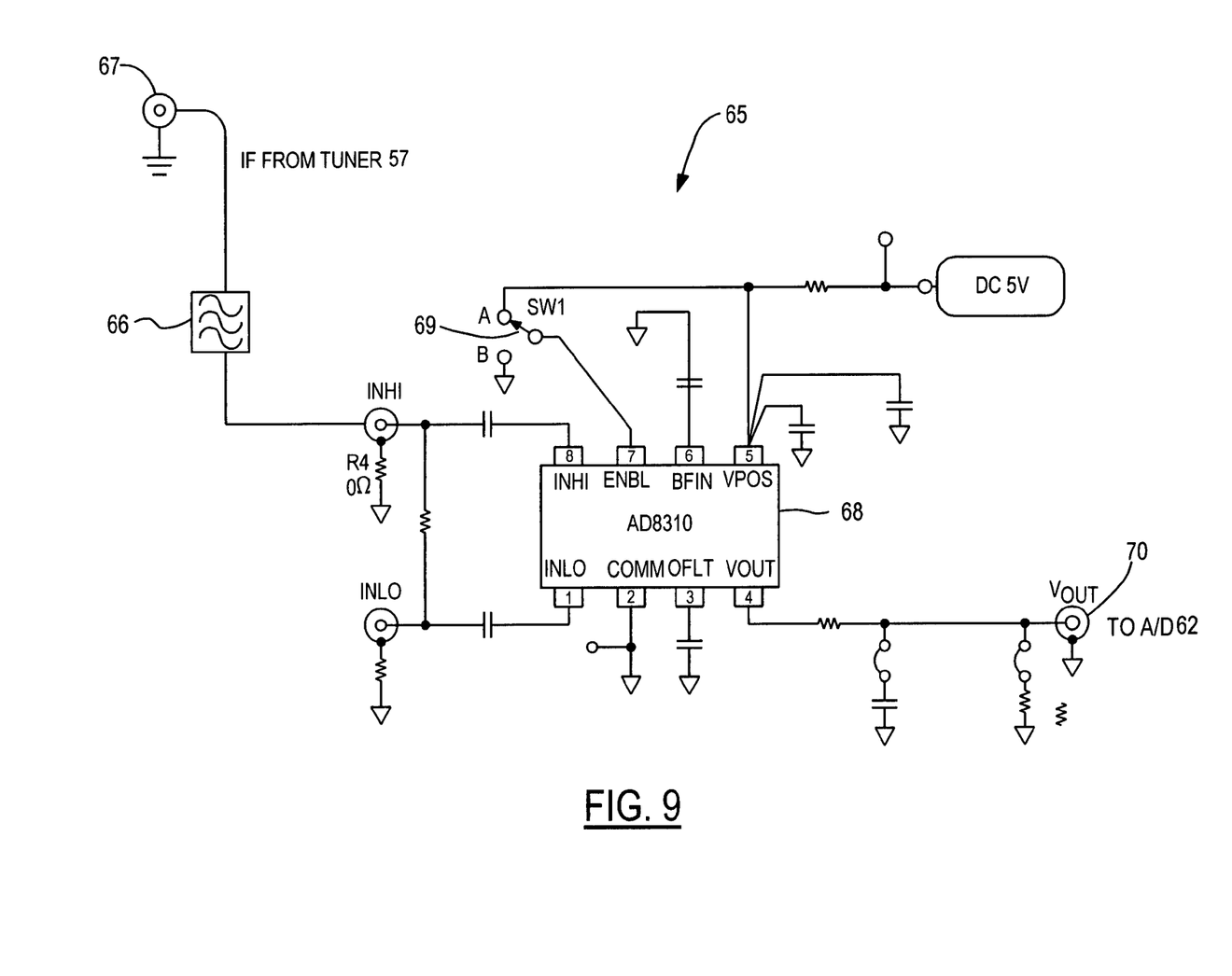
FIG. 9 is a schematic diagram of a level detector.
Figure 10:
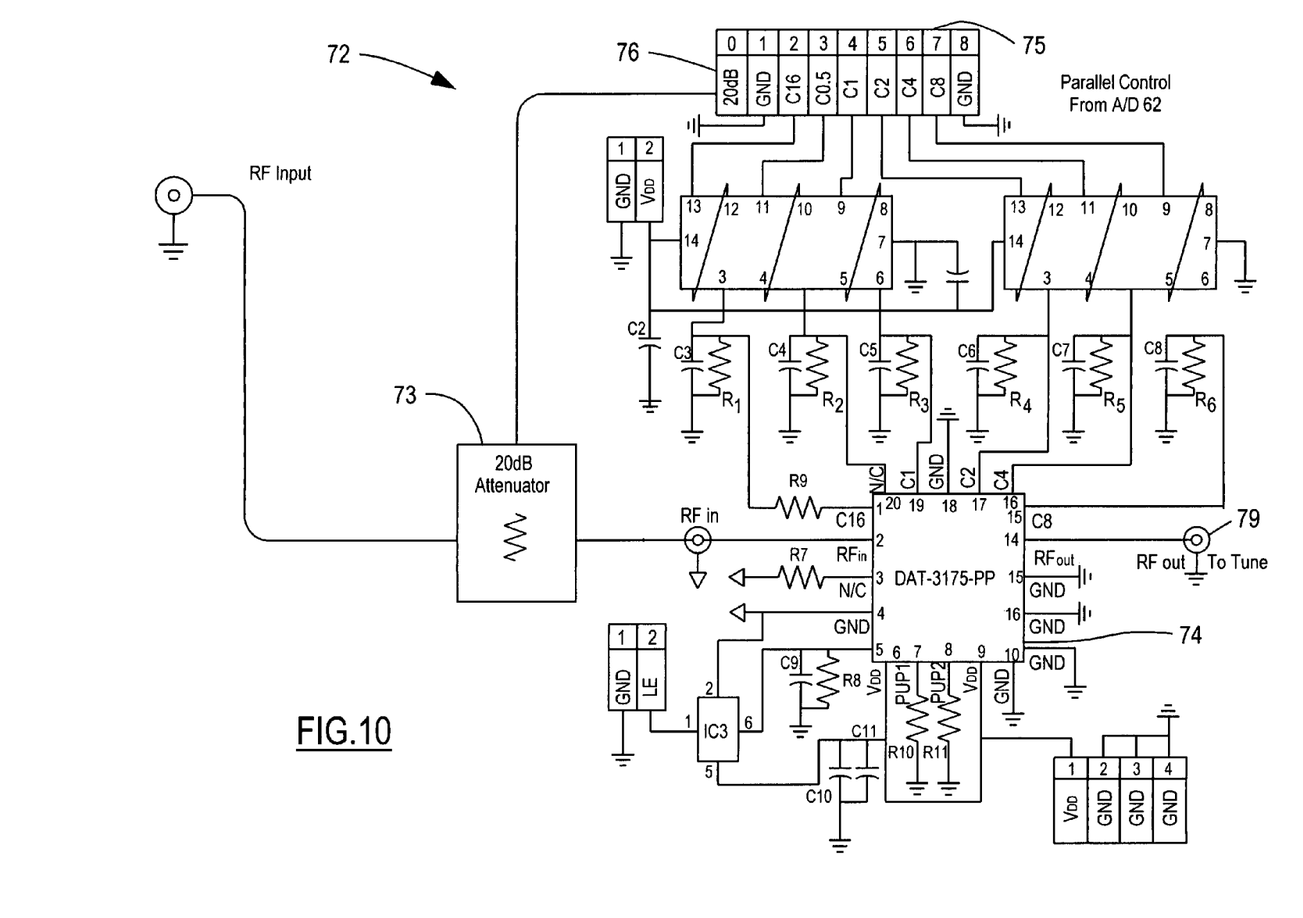
FIG. 10 is a schematic diagram of an RF attenuator for working together with the level detector in order to sustain an RF level at a predetermined magnitude.

In order to automatically calibrate the sampled sync signal according to the level of the desired signal, the IF signal generated in USB video tuner and capture card 57 is provided to a level detector circuit 65 within custom circuit block 60 as shown in FIG. 9. A lowpass filter 66 receives the IF signal from an input connector 67 and couples the filtered IF signal to an input of a logarithmic amplifier 68 which comprises an integrated circuit AD8310 available from Analog Devices, Inc. of Norwood, Mass. Logarithmic amplifier 68 is connected to perform a signal level determination in accordance with published configurations of the AD8310. When a switch 69 is configured to supply a high DC voltage level to an enable input of the AD8310, an output voltage level is provided at an output terminal 70 which is proportional to the received signal strength of the input IF signal. The received signal strength signal is provided to A/D converter 62 and the digitized IF level is provided to an attenuator circuit 72 which is part of the custom circuit block 60 as shown in FIG. 10. In the embodiment of FIG. 9, level detector circuit 65 is implemented using an evaluation board with support components as recommended by Analog Devices.

Attenuator circuit 72 in FIG. 10 can provide two-step attenuation using an analog fixed attenuator 73, and a digitally controlled variable attenuator 74. In particular, variable attenuator 74 is comprised of a digital step attenuator integrated circuit DAT-3175-PP available from Mini-Circuits Laboratory of Brooklyn, N.Y. Fixed attenuator 73 is a known commercial device. The digitized IF level from A/D converter 62 is provided at a connector 75. When a most significant bit 76 of the digitized IF signal is a 1, then fixed analog attenuator 73 is switched on in order to introduce a predetermined attenuation such as 20 dB. Other bits of the parallel control word from the A/D converter 62 are coupled to respective inputs of variable attenuator 74 through respective buffer circuits. The support circuits for integrated circuit DAT-3175-PP are as shown for evaluation board TB-337 also available from Mini-Circuits. An attenuated RF signal is provided at output connector 79 such that the RF signal has been attenuated by the amount necessary to maintain the level of the IF signal at a predetermined level.

Figure 11:
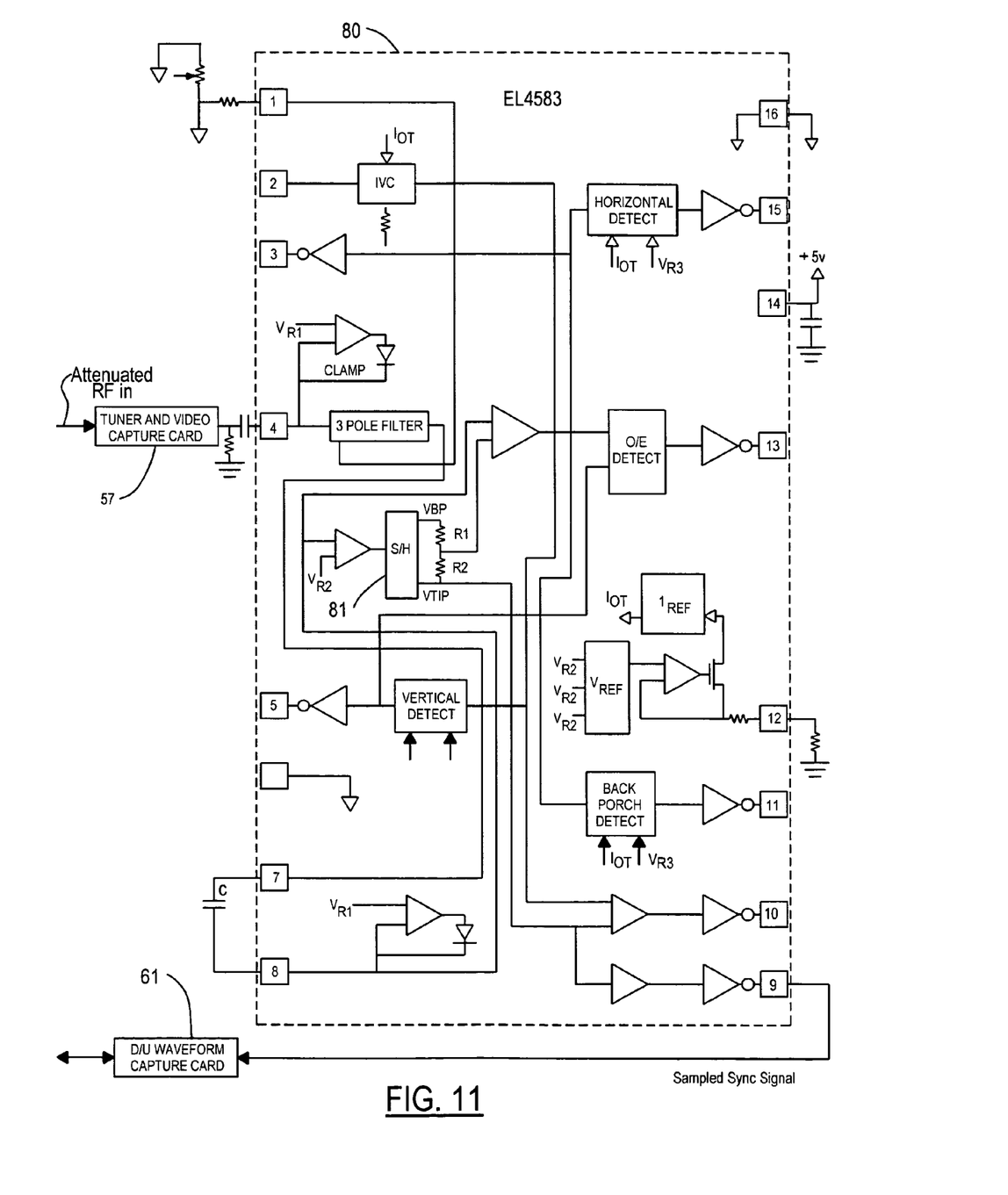
FIG. 11 is a schematic diagram showing a video processor of the invention.

The properly attenuated RF signal is passed to the USB video tuner and capture card 57 which provides a baseband video signal after demodulation to a video processing circuit 80 as shown in FIG. 11. Video processing circuit 80 is included in custom circuit block 60 and is built around a Sync Separator integrated circuit EL4583 available from Intersil Americas Inc. of Milpitas, Calif. The baseband video signal is applied to pin 4 of the EL4583 and after filtering is applied to a sample and hold circuit 81. Pin 9 is a level output which is an analog voltage equal to twice the horizontal sync pulse amplitude of the video input signal applied to pin 4. In a normal video receiver, the level output of pin 9 would be used to provide an indication of signal strength. In the present invention, variations in the level output signal are instead used to characterize signal contributions from undesired signals. Thus, the level output signal from pin 9 is applied to D/U waveform capture card 61 for storage and also for use in an analysis performed by software programs loaded on laptop PC 50. More particularly, the level output at pin 9 provides the sampled sync signal.

Figure 12:
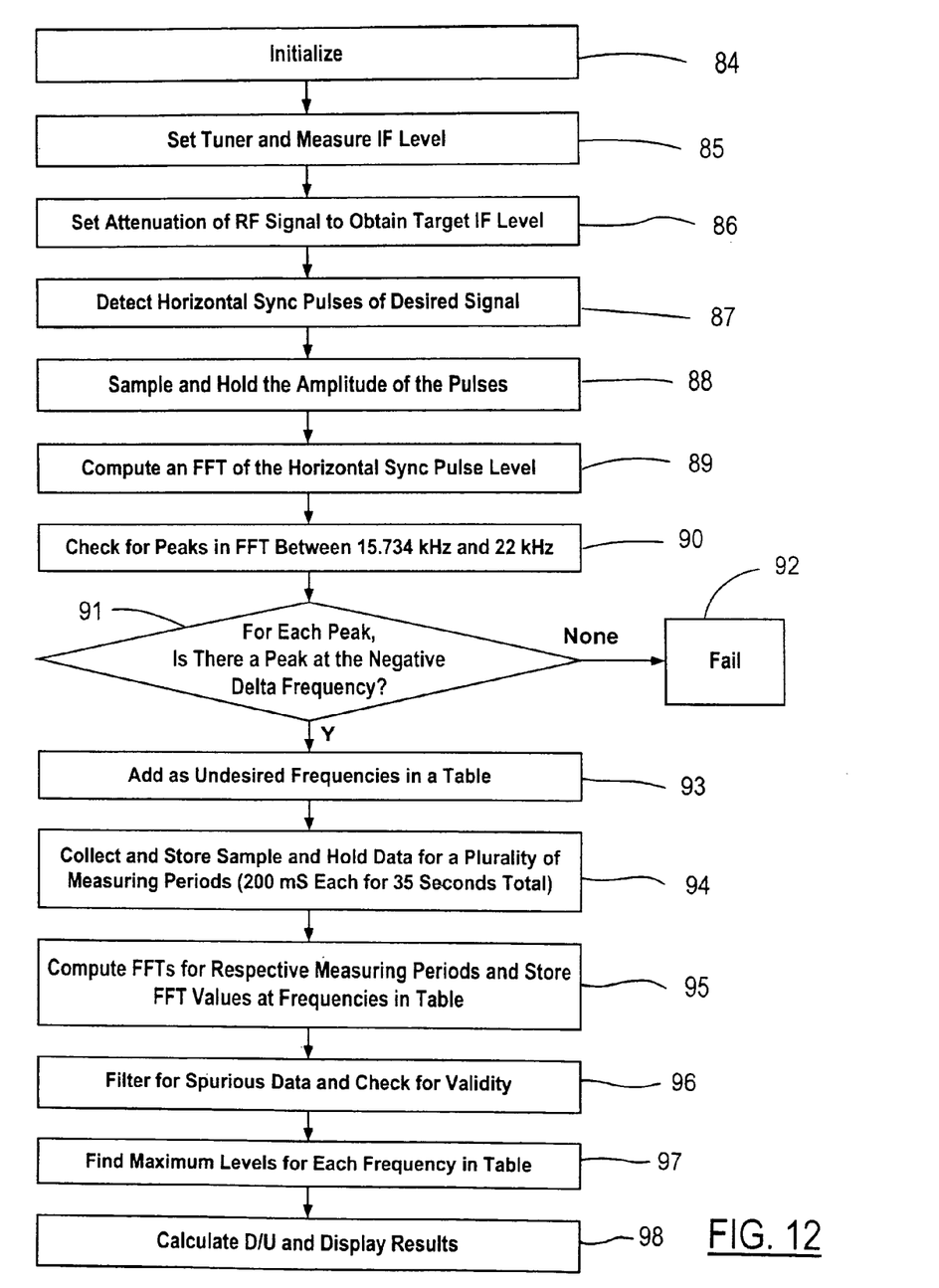
FIG. 12 is a flowchart showing operation of the testing system in greater detail.

A preferred method for identifying carrier frequencies of undesired broadcast signals and for characterizing the D/U ratio is shown in FIG. 12. In step 84, the software components within laptop PC 50 and the states of the hardware elements are all initialized. In step 85, a control program in laptop PC 50 sets the video tuner to the desired shared channel frequency to be tested and then activates the level detecting circuit to measure the IF level. In step 86, the measured IF level is used to set the attenuation of the RF signal in order to obtain a predetermined target IF level which results in calibration of the sampled sync signal so that the D/U ratio can be directly determined from the sampled sync signal level.

In step 87, horizontal sync pulses of the desired signal are detected using the sync separator in the video processing circuit. The amplitude of each horizontal sync pulse is sampled and held until the occurrence of the next horizontal sync pulse in order to construct a sampled sync signal that varies in accordance with the amplitude of each horizontal sync pulse. An FFT of the horizontal sync pulse level from the sampled sync signal is computed in step 89. Based on this first FFT, a search is conducted for the spectral peaks within the FFT in order to identify the presence of undesired broadcast signals that may interfere with the desired signal. A spectral peak may be defined as a frequency bin or bins in the Fourier transform have an amplitude greater than surrounding bins as is known in the art.

In step 90, a search is conducted for peaks within the FFT between 15.734 kHz (the peak corresponding to the horizontal sync frequency of the desired signal) and an upper limit corresponding to a worse case separation of the desired signal and other undesired broadcast signals. The worst case frequency is determined according to the largest frequency error that may be inadvertently present in the transmission of an undesired signal from its assigned frequency plus the predetermined offset frequency deliberately introduced in the transmission of the desired signal for purposes of this test. A typical upper bound may be about 22 kHz, for example.

For each spectral peak found in the search, a check is made to determine whether there is a symmetrical peak at the negative DELTA frequency of such peak in step 91. If no such corresponding symmetrical peaks are found for any peak about 15.7 kHz, then no undesired signals are detected and the test system indicates a failure at step 92.

In step 93, for each peak wherein a corresponding peak is found at the negative DELTA frequency, such DELTA frequency is added as a detected undesired frequency in a table. With the carrier frequencies of the undesired signals having been identified, a complete data collection is performed in step 94 sufficient to allow characterization of the D/U ratio. Thus, the method collects and stores additional sample and hold data for a plurality of measuring periods. In a preferred embodiment, each measuring period lasts about 200 mS and the sum of measuring period spans about 35 seconds (i.e., including about 175 measuring periods). In step 95, Fourier transforms are computed for each respective measuring period. FFT values at the undesired signal carrier frequencies shown in the table are stored. Due to the shifting phase relationship between the desired and undesired broadcast RF signals, interference between the desired and undesired signals varies between constructive interference and destructive interference. It is necessary to identify the occurrence of constructive interference in order to accurately determine the D/U ratio. First, however, the data from the plurality of measuring periods is filtered for spurious data and checked for validity in step 96. Then the maximum level for each table frequency is found in step 97. Based on the maximum levels, the D/U ratio is calculated in step 98 and the results are displayed.

The software for the laptop PC of the present invention is comprised of two main blocks, namely a user interface and automation block and a D/U processing block. The user interface is designed to lead a test technician through each of the steps required to make D/U signal level measurements. In connection with transitioning transmitters getting reassigned channel allocations in the BRS service, the user interface may be adapted to collecting both pre-transition and post-transition measurements. The user interface deals with channel selection, recording and storing of video samples, acquiring and storing data from the D/U module, evaluation of pre- and post-transition measurements for conformity with FCC requirements, and other miscellaneous tasks.

Figure 13:
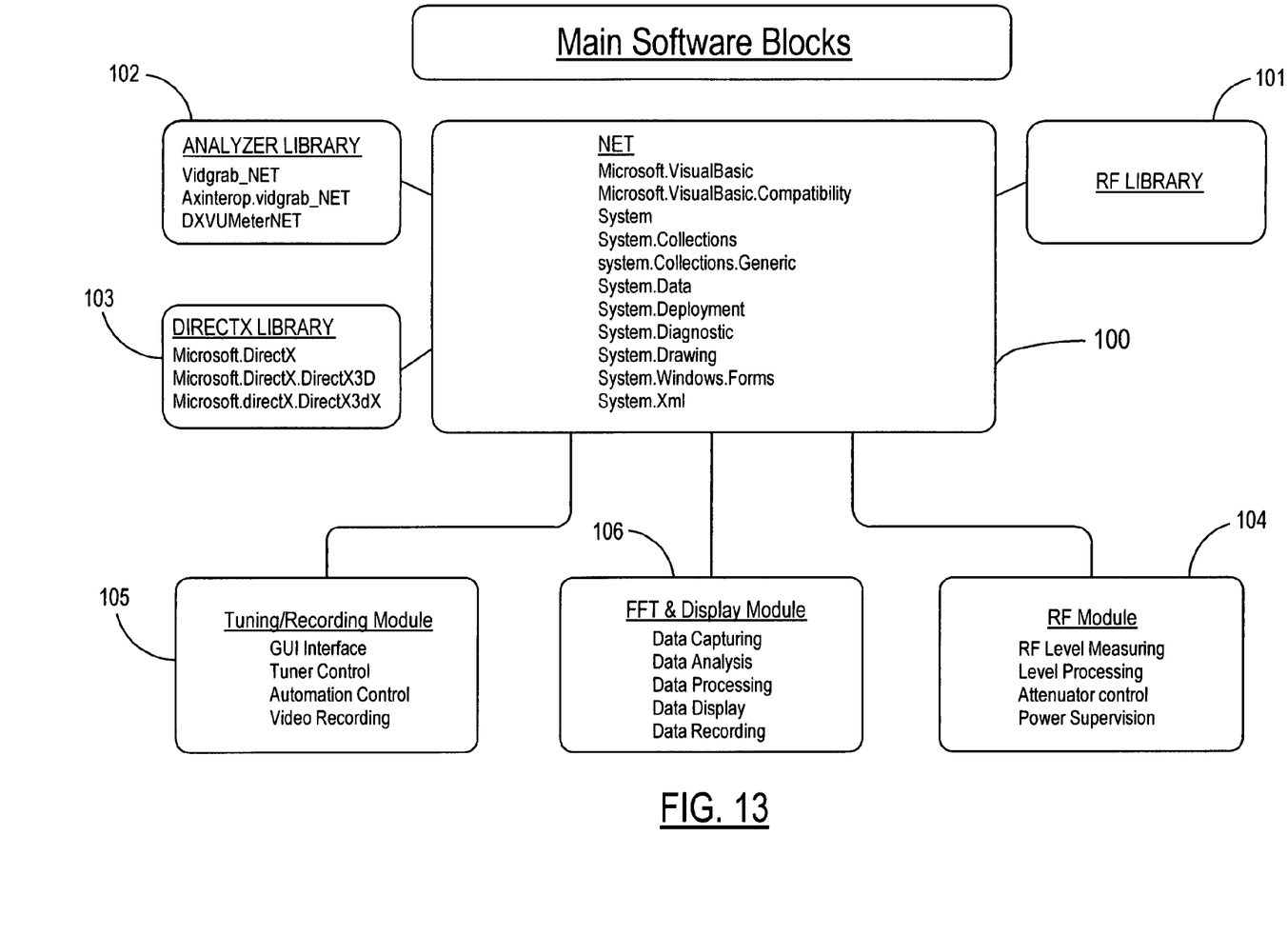
FIG. 13 is a block diagram showing the main software components of the test system.

The D/U processing software operates as previously described in connection with the flowcharts. All of the applications for the laptop PC are based on ActiveX and DLL, taking advantage of the .Net framework and DirectX. FIG. 13 shows main software blocks based within the .Net framework together with various standard libraries of functions 101-103. An RF module 104 is a customized software module for supervising operation of the hardware components as previously described. The tuning/recording module 105 provides the user interface and supervision for selecting the appropriate channel to be characterized. An FFT and display module 106 controls the processing of sampled sync signal data as described in the previous flowcharts. Preferably, a spectrum analyzer within block 106 is comprised of an audio spectrum analyzer of a type that comprises commercially available software.

Figure 14:
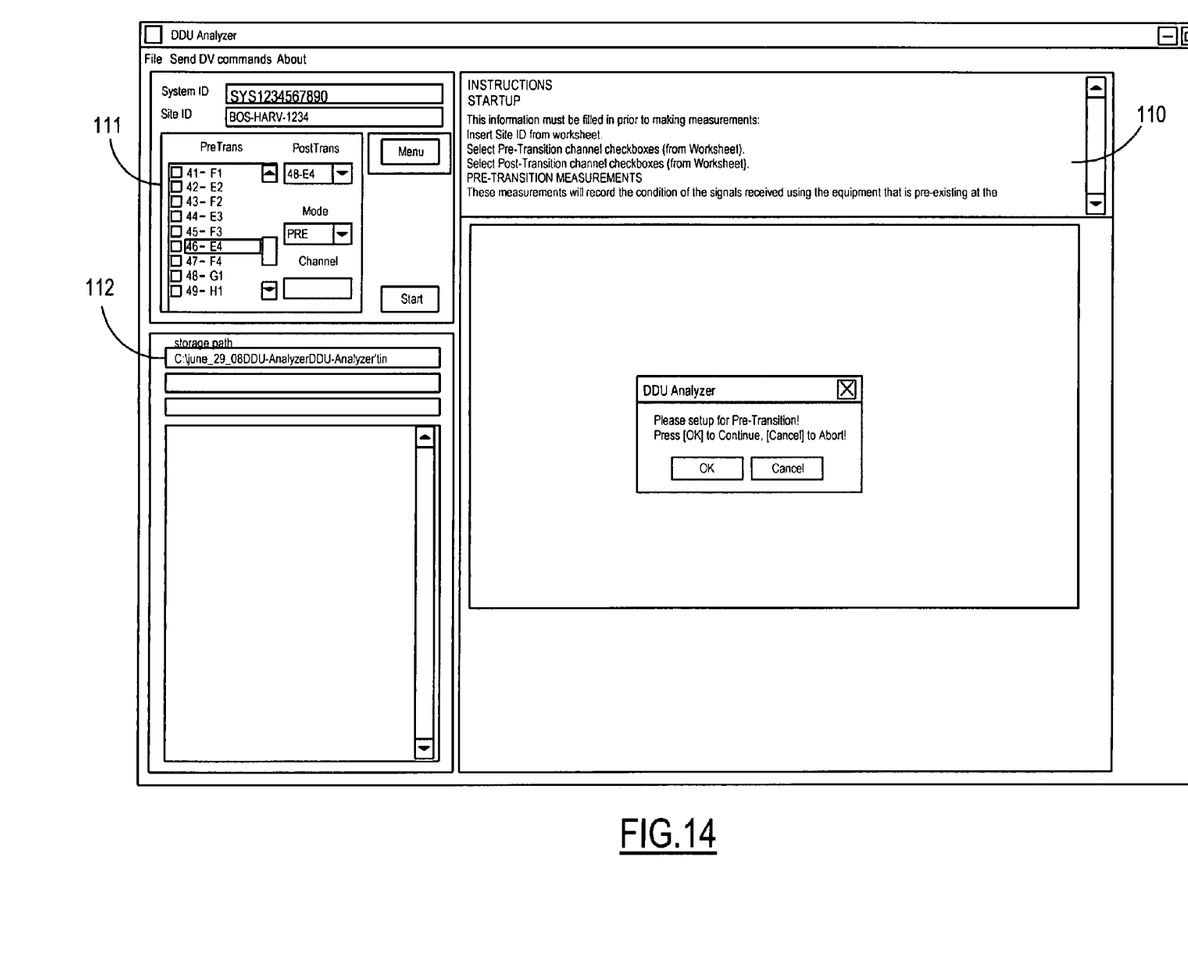
FIG. 14 is a screen shot of a user interface for initiating a test measurement of the present invention.

FIG. 14 shows a screen shot during set up and initialization of the test equipment after connection to a downconverter at a site being tested. An instruction window 110 assists a technician in conducting the necessary operations to obtain a D/U measurement. A window 111 allows the technician to enter identifying information of a particular site and to select a channel frequency for testing, as well as identifying pre- and post-transition measurements. A window 112 is used to indicate a path for storing test data and captured video on the laptop PC.

Figure 15:
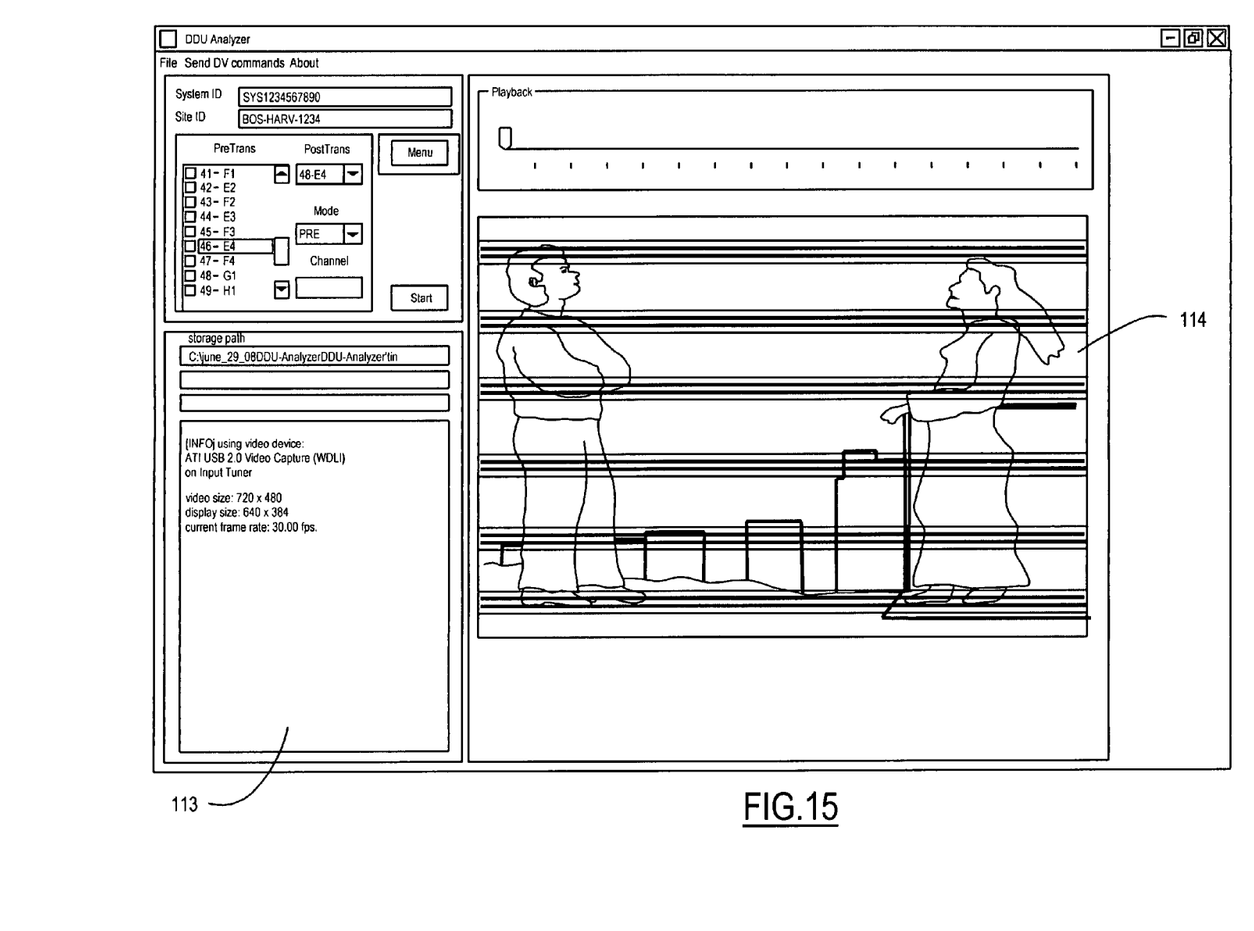
FIG. 15 is a screen shot from the user interface during capture of reception data.

FIG. 15 shows a screen shot during data capture of the present invention. A message window 113 informs the technician of parameters and events during the testing. A video window 114 displays the current desired signal being detected in order to allow the technician to confirm the identity of the desired signal being measured and to show the overall video quality at the time of testing.

Figure 16:
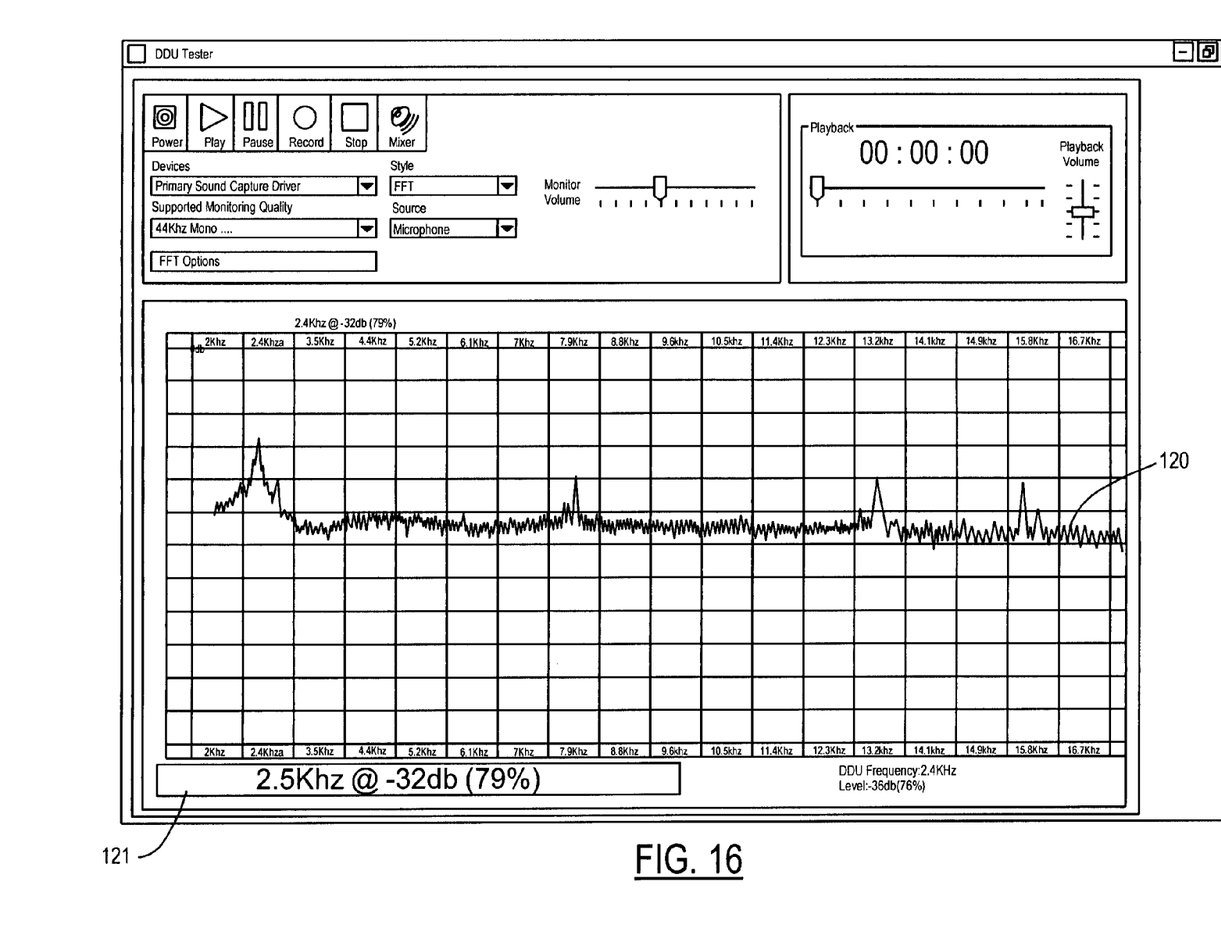
FIG. 16 is a screen shot showing test results.

FIG. 16 is a screen shot showing a results screen. The screen layout is similar to that shown by a conventional audio spectrum analyzer which may be conveniently used in the present invention since the frequency spectrum of the sampled sync signal falls within the audio frequency range. An FFT frequency-power spectrum 120 is plotted as confirmation to the technician that acceptable data has been gathered. For example, visual inspection can confirm the presence of a spectral peak at 15.734 kHz corresponding to the horizontal sync frequency of the desired signal. Based on the data represented in FIG. 16, a DELTA frequency of 2.5 kHz has been identified wherein a D/U ratio of −32 DB is calculated, as shown in window 121. As seen in plot 120, the spectral peak at 2.5 kHz is best identified by the DELTA frequency method rather than by simple visual inspection of spectral peaks. The method of the present invention is sufficiently simple and repeatable to be implemented by software that does not require significant expertise of the test technician in order to operate successfully.

What is claimed is:

1. A method of measuring a D/U ratio for desired and undesired signals in a wireless video transmission system at a shared channel frequency based on a received signal at a geographic location within a respective service area for the desired signal, comprising the steps of:

locating measurement equipment to receive the received signal in the respective service area;

downconverting the received signal to an intermediate frequency signal in the measurement equipment;

demodulating the intermediate frequency signal to generate a baseband video signal in the measurement equipment;

identifying horizontal sync pulses within the baseband signal;

generating a sampled sync signal containing an undesired signal component;

determining a Fourier transform having a plurality of bins in response to the sampled sync signal;

finding a bin having a spectral peak corresponding to the frequency of the horizontal sync pulses of the desired signal;

finding at least one delta frequency such that a pair of bins symmetrically spaced above and below the frequency of the horizontal sync pulses by the delta frequency exhibit spectral peaks, wherein the delta frequency identifies the frequency of the bin having a spectral peak of the undesired signal;

calculating the D/U ratio in response to a magnitude of the identified peak of the undesired signal; and displaying the D/U ratio to a technician using the measurement equipment.

2. The method of claim 1 wherein the sampled sync signal corresponds to a level of the horizontal sync pulses, and wherein the step of generating a sampled sync signal comprises:

activating a sample and hold circuit during occurrence of each successive horizontal sync pulse.

3. The method of claim 1 further comprising the step of offsetting the transmitter carrier frequency of the desired signal from the shared channel frequency by a predetermined offset frequency.

4. The method of claim 1 wherein the step of finding at least one delta frequency comprises:

scanning for spectral peaks from the frequency of the horizontal sync pulses up to a predetermined maximum frequency; and checking for a spectral peak below the frequency of the horizontal sync pulses corresponding to each spectral peak found during the scanning.

5. The method of claim 1 further comprising the step of normalizing prior to generating the sampled sync signal.

6. The method of claim 5 wherein said normalizing is comprised of measuring an IF level of the intermediate frequency signal and attenuating the received signal in response to the IF level.

7. The method of claim 1 further comprising the step of electronically storing the sample sync signal and the baseband video signal for comparing with additional measurements done at a later time.

8. The method of claim 1 wherein the sampled sync signal has a duration of at least about 30 seconds.

9. The method of claim 8 wherein the step of determining a Fourier transform is determined for a plurality of measuring periods within the sampled sync signal, and wherein the D/U ratio is calculated for a measuring period having a maximum amplitude of the undesired signal.

10. A system for measuring a D/U ratio for desired and undesired signals in a wireless video transmission system at a shared channel frequency based on a received signal at a geographic location in a respective service area for the desired signal, comprising:

a video tuner for demodulating the received signal to generate a baseband video signal;

a video processor identifying horizontal sync pulses within the baseband video signal and generating a sampled sync signal containing an undesired signal component; and a D/U analyzer determining a Fourier transform having a plurality of bins in response to the sampled sync signal, identifying at least one of the bins having a spectral peak corresponding to the frequency of the horizontal sync pulses of the desired signal, finding at least one delta frequency such that a pair of bins symmetrically spaced above and below the frequency of the horizontal sync pulses by the delta frequency exhibit spectral peaks wherein the delta frequency identifies the frequency of the bin having a spectral peak of the undesired signal, and calculating the D/U ratio in response to a magnitude of the identified peak.

11. The system of claim 10 further comprising a leveling circuit for normalizing the received signal.

12. The system of claim 11 wherein the leveling circuit comprises a level detector and an attenuator, wherein an output of the level detector controls a magnitude of attenuation provided by the attenuator.

13. The system of claim 10 wherein the video processor comprises a sample and hold circuit for sampling a level of each horizontal sync pulse.

14. The system of claim 10 wherein the video tuner comprises a PC video tuner/video capture card and wherein the D/U analyzer comprises audio spectrum analyzer software and a PC sound card.

15. The system of claim 10 further comprising:

a graphical display for displaying the D/U ratio and a plot of the sampled sync signal.

16. The system of claim 15 wherein the graphical display further displays a video reproduction of the desired signal.

17. The system of claim 10 further comprising:

a memory for archiving the baseband video signal, the sampled sync signal, and the calculated D/U ratio.

* * * * *